US00RE42066E

(19) United States
(12) Reissued Patent
Svensson et al.

(10) Patent Number: US RE42,066 E
(45) Date of Reissued Patent: Jan. 25, 2011

(54) SYSTEM AND METHOD FOR POWER-EFFICIENT CHARGING AND DISCHARGING OF A CAPACITIVE LOAD FROM A SINGLE SOURCE

(75) Inventors: Lars G. Svensson, Partille (SE); William C. Athas, San Jose, CA (US); Jeffrey G. Koller, Oxnard, CA (US)

(73) Assignee: University of Southern California, Los Angeles, CA (US)

(21) Appl. No.: 11/040,608

(22) Filed: Jan. 21, 2005

Related U.S. Patent Documents

Reissue of:
(64) Patent No.: 5,473,526
Issued: Dec. 5, 1995
Appl. No.: 08/231,637
Filed: Apr. 22, 1994

U.S. Applications:
(63) Continuation of application No. 09/758,631, filed on Jan. 10, 2001, now Pat. No. Re. 38,918, which is a continuation of application No. 08/986,327, filed on Dec. 5, 1997, now Pat. No. Re. 37,552.

(51) Int. Cl.
*H02M 3/07* (2006.01)

(52) U.S. Cl. ..... 363/60; 307/109
(58) Field of Classification Search ..... 363/56, 363/59, 60, 61; 320/166; 307/106, 109, 110
See application file for complete search history.

(56) References Cited

U.S. PATENT DOCUMENTS 3,594,627 A * 7/1971 Lesher ..... 320/103
3,603,898 A 9/1971 Dawson et al.
3,654,537 A 4/1972 Coffey
3,836,906 A 9/1974 Ando et al.
4,082,430 A 4/1978 Schulthess et al.
4,107,757 A 8/1978 Masuda et al.
4,109,192 A 8/1978 Burbank et al.

(Continued)

OTHER PUBLICATIONS

Ammer, J., M. Bolotski, P. Alveida, T.F. Knight, Jr., "TP12.5: A 160×120 Pixel Liquid–Crystal–on–Silicon Microdisplay with an Adiabatic DACM," In *1999 IEEE Interational Solid–States Circuits Conference Digest of Technical Papers,* pp. 212–213.
Ammer, J., M. Bolotski, P. Alvelda, T.F. Knight, Jr., "TP12.5: A 160×120 Pixel Liquid–Crystal–on–Silicon Microdisplay with an Adiabatic DAC," *1999 ISSCC Slide Supplement,* pp. 184–185, 435–.
Athas, William C., "Energy–Recovery CMOS," Chapter 5 in J. Rabaey, M. Pedram (Eds.) *Low–Power Design Methodologies,* Kluwer Academic Press, 1996.
Athas, W.C. and L.J. Svensson, *Reversible Logic Issues in Adiabatic CMOS,* IEEE Worshop on Physics and Computation, Nov. 17–20, 1994 www.isi.edu/acmos.

(Continued)

*Primary Examiner*—Adolf Berhane
(74) *Attorney, Agent, or Firm*—McDermott Will & Emery LLP

(57) ABSTRACT

A system and method for efficiently charging and discharging a capacitive load from a single voltage source. The system includes a first switch for selectively connecting the voltage source to the load and a second switch for selectively providing a short across the load as may be common in the art. A particularly novel aspect of the invention resides in the provision of plural capacitive elements and a switching mechanism for selectively connecting each of the capacitive elements to the load whereby the load is gradually charged or discharged. In the illustrative embodiment, the switching mechanism includes a set of switches for selectively connecting each of the capacitive elements to the capacitive load and a switch control mechanism for selectively activating the switches.

16 Claims, 4 Drawing Sheets

U.S. PATENT DOCUMENTS

| | | | |
|---|---|---|---|
| 4,328,525 | A | 5/1982 | Allen et al. |
| 4,594,589 | A | 6/1986 | Ohba et al. |
| 4,605,999 | A | 8/1986 | Bowman et al. |
| 4,707,692 | A | 11/1987 | Higgins et al. |
| 4,802,739 | A | 2/1989 | Iwamoto |
| 4,818,981 | A | 4/1989 | Oki et al. |
| 4,862,113 | A | 8/1989 | Buhler et al. |
| 4,893,117 | A | 1/1990 | Blomley et al. |
| 4,920,474 | A | 4/1990 | Bruning et al. |
| 5,051,668 | A | 9/1991 | Kawaberi et al. |
| 5,063,340 | A | 11/1991 | Kalenowsky |
| 5,095,223 | A | 3/1992 | Thomas |
| 5,105,288 | A | 4/1992 | Senda et al. |
| 5,107,136 | A | 4/1992 | Stekelenburg |
| 5,126,589 | A | 6/1992 | Renger |
| 5,150,013 | A | 9/1992 | Bobel |
| 5,206,632 | A | 4/1993 | Dupont et al. |
| 5,247,376 | A | 9/1993 | Wakai et al. |
| 5,264,752 | A | 11/1993 | Savicki |
| 5,293,082 | A | 3/1994 | Bathaee |
| 5,339,236 | A | 8/1994 | Tamagawa |
| 5,349,366 | A | 9/1994 | Yamazaki et al. |
| 5,400,028 | A | 3/1995 | Schlig |
| 5,459,414 | A | 10/1995 | Dickinson |
| 5,465,054 | A | 11/1995 | Erhart |
| 5,473,269 | A | 12/1995 | Dickinson |
| 5,473,526 | A | 12/1995 | Svensson et al. |
| 5,506,520 | A | 4/1996 | Frank et al. |
| 5,508,639 | A | 4/1996 | Fattaruso |
| 5,510,748 | A | 4/1996 | Erhart |
| 5,517,145 | A | 5/1996 | Frank |
| 5,521,538 | A | 5/1996 | Dickinson |
| 5,526,319 | A | 6/1996 | Dennard et al. |
| 5,528,256 | A | 6/1996 | Erhart et al. |
| 5,559,463 | A | 9/1996 | Denker et al. |
| 5,559,478 | A | 9/1996 | Athas et al. |
| 5,572,211 | A | 11/1996 | Erhart et al. |
| 5,578,957 | A | 11/1996 | Erhart et al. |
| 5,602,497 | A | 2/1997 | Thomas |
| 5,604,449 | A | 2/1997 | Erhart et al. |
| 5,604,454 | A | 2/1997 | Maguire et al. |
| 5,657,039 | A | 8/1997 | Mizukata et al. |
| 5,675,263 | A | 10/1997 | Gabara |
| 5,694,445 | A | 12/1997 | Hirano et al. |
| 5,734,285 | A | 3/1998 | Harvey |
| 5,748,165 | A | 5/1998 | Kubota et al. |
| 5,754,156 | A | 5/1998 | Erhart et al. |
| 5,818,252 | A | 10/1998 | Fullman et al. |
| 5,821,923 | A | 10/1998 | Van Amesfoort et al. |
| 5,838,203 | A | 11/1998 | Stamoulis et al. |
| 5,838,289 | A | 11/1998 | Saito et al. |
| 5,841,299 | A | 11/1998 | De |
| 5,852,426 | A | 12/1998 | Erhart et al. |
| 5,861,861 | A | 1/1999 | Nolan et al. |
| 5,870,331 | A | 2/1999 | Hwang et al. |
| 5,880,602 | A | 3/1999 | Kaminaga et al. |
| 5,881,014 | A | 3/1999 | Ooishi |
| 5,883,538 | A | 3/1999 | Keeth et al. |
| 5,889,439 | A | 3/1999 | Meyer et al. |
| 5,892,540 | A | 4/1999 | Kozlowski et al. |
| 5,896,117 | A | 4/1999 | Moon |
| 5,900,854 | A | 5/1999 | Itoh et al. |

OTHER PUBLICATIONS

Athas, W.C., J. Koller and L. Svensson, *An Energy–Efficient CMOS Line Driver Using Adiabatic Switching,* University of Southerm California, Information Sciences Institute Technical Report ACMOS–TR–2, Aug. 15, 1993, pp. 1–16.

Athas, W.C., J. Koller and L. Svensson, "An Energy–Efficient CMOS Line Driver Using Adiabatic Switching," *IEEE,* pp. 196–199.

Athas, W.C., L. "J." Svensson and N. Tzartzanis, "A Personal Signal Drive For Two–Phase, Almost–Non–Overlapping Clocks," *IEEE International Symposium on Circuits and Systems,* May 1996.

Athas, W.C., N. Tzartzanis, L. Svensson, L., Peterson, H. Li, X. Jiang, P. Wang, W–C. Liu, "AC–1: A Clock–Powered Microprocessor," *IEEE Intl. Symposium on Low–Power Electronics and Design,* Aug. 1997.

Athas, William C., Lars "J." Svensson, Jeffrey G. Koller, Nestoras Tzartzanis and Eric Ying–Chin Chou, "Low–Power Digital Systems Based on Adiabatic–Switching Principles," *IEEE Transactions on Very Large Scale Integration (VLSI) Systems,* vol. 2, Dec. 1994, pp. 398–407.

Burr et al., "Energy Considerations in Multichip–Module based Multiprocessors, " *IEEE International Conference on Computer Design* 1991, pp. 593–600.

Chandrakasan et al., "Low–Power CMOS Digital Design," *IEEE Journal of Solid–State Circuits,* Apr. 1992, vol. 27, No. 4, pp. 473–484.

Davis, Andrew W. "Flat Panel Display Drivers: 'Little Things' Changing The Image Quality Picture," *Advanced Imaging,* Oct. 1997, vol. 12, No. 10, pp. 10, 12, 62.

Dharmasena, Sanjaya and Lars Svensson, "Startup Energies in Energy–Recovery CMOS," in Proceedings of Physics and Computation '96, Boston, MA, Nov. 22–24, 1996.

Dickinson, Alex G. and John S. Denker, "Adiabatic Dynamic Logic," *IEEE, Custom Integrated Circuits Conference,* 1994, pp. 282–285.

Erhart, A. "P–10: Late Poster Paper: A High–Voltage High–Gray–Shade LCD Column Driver Utilizing a Standard 1.2–μm CMOS Process," *SID 94 Digest,* 1994, pp. 471–474.

Erhart, Alex, "Direct Drive Promises Reduced Power Consumption and Improved Image Quality for Notebook AMLCDs," *Information Display,* Dec. 1996, vol. 12, No. 12, pp. 24–27.

*Flat Panel Display Handbook, Technology Trends & Fundamentals,* First Edition, 1999, San Jose: Stanford Resources, 1999.

Fundaun, I., C. Reese and H.H. Soonpaa (Physics Department, University of North Dakota, Grand Forks), "Charging a capacitor," *American Journal of Physics,* vol. 60, No. 11, Nov. 1999, pp. 1047–1048.

Heinrich, F. (Laboratory of Solid State Physics, Swiss Federal Institute of technology ETH), Entrophy Change When Charging A Capacitor: A Demonstration Experiment, *American Journal of Physics,* vol. 54, No. 8, Aug. 1986, pp. 742–744.

Jonscher, A.K. (Royal Holloway and Bedford New College, Univ. of London), "Charging and Discharging of Non–Ideal Capacitors," *IEEE Transactions on Electrical Insulation,* vol. EI–22, No. 4, Aug. 1987, 357–359.

Kawahara, T., M. Horiguchi, Y. Kawajiri, T. Akiba, G. Kitsukawa, T. Kure, and M. Aoki. "A Charge Recycle Refresh for Gb–scale DRAMs in File Applications," *1993 Symposium on VLSI Circuits, Digest of Technical Papers,* May 19–21, 1993, pp. 41–42.

Koller, Jeffrey G. and William C. Athas, "Adiabatic Switching, Low Energy Computing, and the Physics of Storing and Erasing Information," IEEE Press 1993, pp. 267–270.

Lieberman, David, "EL Design Yields Brighter Display At Lower Power," *Electronic Engineering Times,* No. 1021, Aug. 1998, pp. 52–.
Maksimovic, Dragan, "A MOS Gate Drive With Resonant Transitions," IEEE Press, 1991, pp. 527–532.
Mateo, D. and A. Rubio, "Quasi–adiabatic ternary CMOS logic," *Electronics Letters,* vol. 32, No. 2, Jan. 18, 1996, pp. 99–101.
Mead et al., "Chapter 1, MOS Devices and Circuits," *In Introduction to VLSI Systems,* 1980, Addison–Wesley, pp. 1–37.
Morimura, Hiroki and Nobutaro Shibata, "A 1–V 1–Mb SRAM for Portable Equipment," *ISLPED, 1996 Monterey CA USA,* pp. 61–66.
Nordin et al., "A Systems Perspective on Digital Interconnection Technology," *IEEE Journal of Lightwave Technology,* Jun. 1992, vol. 10, No. 6, pp. 811–827.
*RCA Transistor Thyristor & Diode Manual* RCA Corporation, 4/71, Technical Series SC–15, 1971, pp. 179–183.
Schlig, E.S. and J.L. Sanford, "New Circuits for AMLCD Data Line Drivers," 1994.
Seitz et al., "Hot–Clock nMOS," *Proceedings of the 1985 Chapel Hill Conference on VLSI,* 1985, pp. 1–17.
Sekiguchi, Tomonori, Masashi Horiguchi, Takeshi Sakata, Yoshinobu Nakagome, Shigeki Ueda and Masakazu Aoki, "Low–Noise, High–Speed Data Transmission Using a Ringing–Canceling Output Buffer," *IEEE Journal of Solid–State Circuits,* vol. 30, No. 12, 1995, pp. 1569–1574.
Somasekhar, Dinesh, Yibin Ye and Kaushik Roy, "An Energy Recovery Static RAM Memory Core," in *IEEE Symposium on Low–Power Electronics,* 2d ed., 1995, pp. 62–63.
Svensson L. et al., *Adiabatic Charging Without Inductors,* USC/ISI Technical Report ACMOS–TR–3, Dec. 17, 1993.
[Svensson, L.J.] LS. "LCD Driver Test Chip Evaluation," Oct. 21, 1996.
Svensson, L. "J.", W.C. Athas and R.S.–C. Wen, "A sub–$CV^2$ pad driver with 10 ns transition time," *ISLPED 1996 Monterey CA USA,* Aug. 1996, pp. 105–108.
Svensson, L. "J." and W.C. Athas, "Stepwise Charging Without Equations," USC/ISI, Feb. 25, 1997, pp. 1–4.
Tzartzanis, Nestor and William C. Athas, "Clock–Powered CMOS: A Hybrid Adiabatic Logic Style for Energy–Efficient Computing, " *20th Anniversary Conference on Advanced Reseach in VLSI,* IEEE Computer Society Press, Mar. 1999.
Tzartzanis, Nestor and William C. Athas "Energy–Recovery for the Design of High–Speed, Low–Power Static RAMs," *International Symposium on Low–Power Electronics and Design,* Aug. 1996, *Monterey CA USA,* pp. 55–60.
Tzartzanis, Nestor, *Energy–Recovery Techniques for CMOS Microprocessor Design,* Ph.D. Dissertation, University of Southern California, Aug. 1998, 163 pp.
Weste et al., "Principles of CMOS VLSI Design, A Systems Perspective," Chapter 5 in *CMOS Circuit and Logic Design,* 2d Edition, 1993, Addison–Wesley, pp. 160–231.
Ye, Yibin and Roy Kaushik, "Energy Recovery Circuits Using Reversible and Partially Reversible Logic," *IEEE Transactions on Circuits and Systems—I. Fundamental Theory,* vol. 43, No. 9, 1996, pp. 769–778.
Younis, Saed G. and Thomas F. Knight, Jr., "Non–Dissipative Rail Drivers for Adiabatic Circuits," *IEEE, 9/95,* pp. 404–414.
Yuan, Jiren (Linkoping Univeristy), "Low Power and Low Area or High Throughput Single–Ended Bus and I/O Protocols," *Proceedings of 1997 IEEE International Symposium on Circuits and Systems: Circuits and Systems in the InformationAge, ISCAS '97, Jun. 9–12, 1997, Hong Kong,* pp. 1932–1935.

* cited by examiner

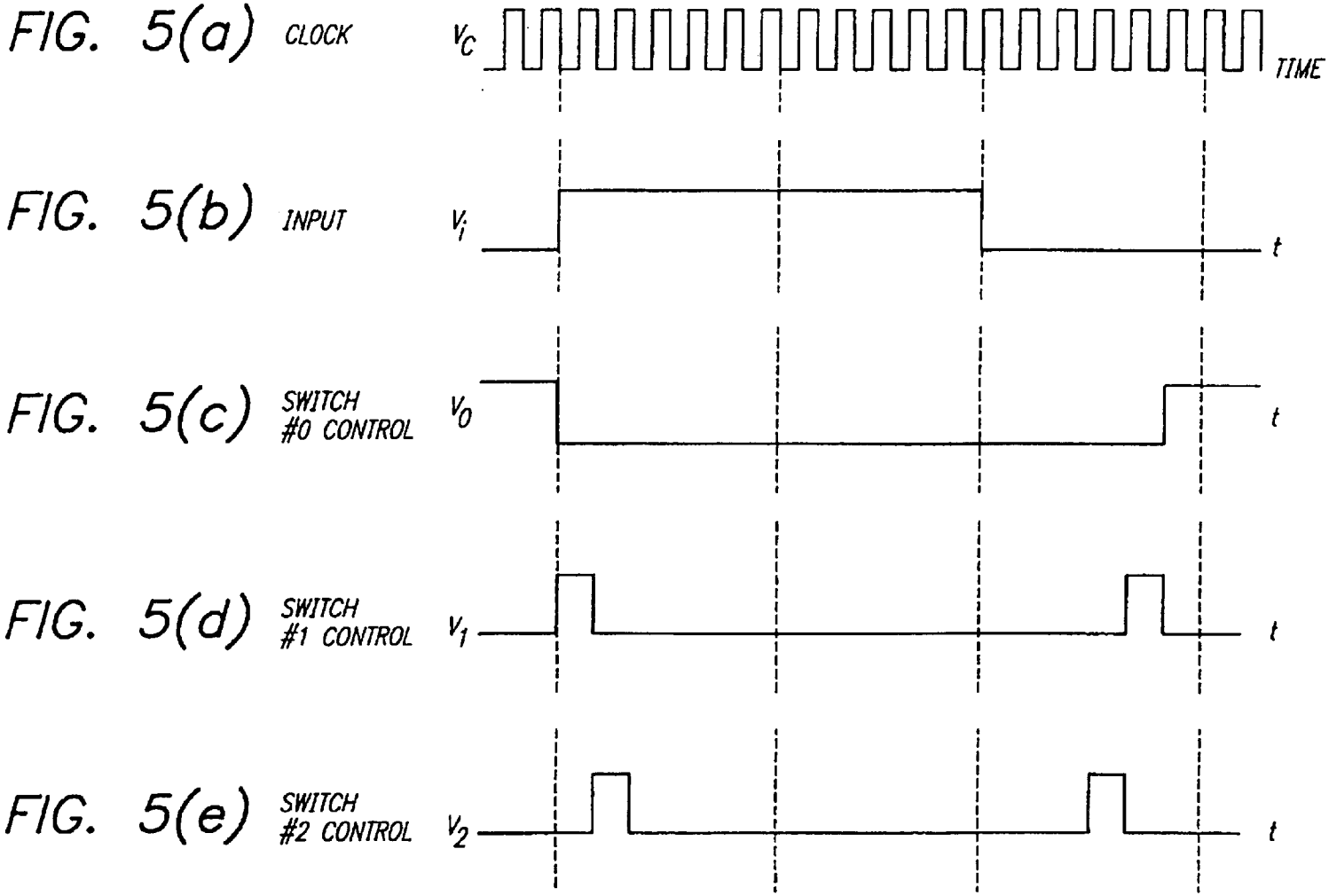
FIG. 5(a) CLOCK
FIG. 5(b) INPUT
FIG. 5(c) SWITCH #0 CONTROL
FIG. 5(d) SWITCH #1 CONTROL
FIG. 5(e) SWITCH #2 CONTROL

SYSTEM AND METHOD FOR POWER-EFFICIENT CHARGING AND DISCHARGING OF A CAPACITIVE LOAD FROM A SINGLE SOURCE

Matter enclosed in heavy brackets [ ] appears in the original patent but forms no part of this reissue specification; matter printed in italics indicates the additions made by reissue.

*CROSS-REFERENCE TO RELATED APPLICATIONS*

*This Reissue Application, Reissue application Ser. No. 08/986,327, and Reissue application Ser. No. 09/758,631 are all three reissue applications of U.S. Pat. No. 5,473,526, issued Dec. 5, 1995. This application is a continuation of Reissue application Ser. No. 09/758,631, filed Jan. 10, 2001 (now issued as U.S. Reissue Pat. No. RE 38,918, issued Dec. 13, 2005), entitled "System And Method For Power-Efficient Charging And Discharging Of A Capacitive Load From A Single Source", which is a continuation of application Ser. No. 08/986,327, entitled "System And Method For Power-Efficient Charging And Discharging Of A Capacitive Load From A Single Source," filed Dec. 5, 1997 (now issued as U.S. Reissue Pat. No. RE 37,552, issued Feb. 19, 2002).*

*GOVERNMENT'S INTEREST IN APPLICATION*

*This invention was made with government support under DABT-63-92-C-0052 awarded by ARPA. The government has certain rights in the invention.*

BACKGROUND OF THE INVENTION

1. Field of the Invention

The present invention relates to electronic circuits and systems. More specifically, the present invention relates to power dissipation in electronic circuits and systems.

2. Description of the Related Art

Power dissipation of electronic circuitry is an important design consideration for many applications. Power dissipation provides a measure of the efficiency of the system. The efficiency of the system impacts the design of the power supply for the system. That is, low efficiency leads to higher costs due to the waste of energy and the need for larger power supplies.

For battery powered systems, power dissipation limits battery life. This necessitates larger batteries which increases the cost and weight of the system while limiting the applicability thereof. As an example, consider coronary pacemakers where power dissipation is a critical concern due to the difficultly of accessing the battery for replacement and the cost and inconvenience associated with the use of larger batteries.

In addition, the dissipated energy is released in the form of heat. Accordingly, systems which exhibit considerable power dissipation often require measures such as heat sinks to protect or cool system components from the heat created by the circuit. The use of heat sinks and the like adds to the cost, size and weight of the system and thereby limits the utility of same.

For the CMOS (complementary-metal-oxide semiconductor) based system, used widely in the design of computers, digital logic circuits and the like, capacitive effects are primarily responsible for the dissipation of power. Such capacitive effects arise due to junction capacitances within semiconductor devices, interlead capacitances between lines connecting the circuit to external devices and the capacitance of a load.

In accordance with conventional teachings, power dissipation is directly related to the operating frequency (f), the capacitance (C) and the square of the voltage ($V^2$) applied to the capacitive element.

In addition to the elimination of unnecessary capacitances and the reduction of the switching frequency to the lowest value that supports the functional specification of the circuit, most prior approaches to the problem have focused on reducing the voltage applied to the capacitive elements. However, in addition to costly interfacing issues, attempts to lower the voltage of digital processors and the like have been limited by the fact that the trend is to higher processing speeds which cannot be attained at arbitrarily low operating voltages.

Thus, there is an ongoing need in the art for a system and technique for minimizing the power dissipated by a digital system.

SUMMARY OF THE INVENTION

The need in the art is addressed by the present invention which, in a most general sense, provides a system and method for efficiently charging and discharging a capacitive load from a single voltage source. The inventive system includes a first switch for selectively connecting the voltage source to the load and a second switch for selectively providing a short across the load as may be common in the art. A particularly novel aspect of the invention resides in the provision of plural capacitive elements and a switching mechanism for selectively connecting each of the capacitive elements to the load whereby the load is gradually charged or discharged.

In the illustrative embodiment, the switching mechanism includes a set of switches for selectively connecting each of the capacitive elements to the capacitive load and a switch control mechanism for selectively activating the switches.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof.

Most of the power dissipation in digital CMOS circuits is due to repeated charging and discharging of capacitive loads including those internal to the circuit and those associated with the output signals.

Figure 1:
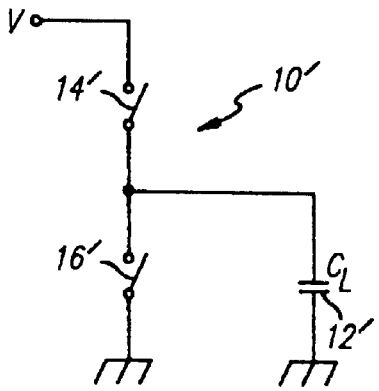
FIG. 1 PRIOR ART
FIG. 1 is a simplified representation of a conventional driver for a capacitive load.

FIG. 1 is a simplified representation of a conventional driver for a capacitive load. The load $C_L$ represents the capacitance of a load and the interlead capacitance of the lines connecting the driver 10' to the load 12'. The load 12' is charged to the supply voltage V by connecting the load 12' to the power rail via a first switch 14'. In practice, the switch 14' may be a metal-oxide semiconductor field-effect transistor (MOSFET) which has a nominal "on" resistance. When the switch 14' is closed, a charge CV passes through the resistance of the switch 14'. The voltage drop across the resistance varies from an initial value of V to a final value of zero, so the average voltage drop V traversed by the charge is V/2, if the capacitance is linear. The energy dissipated is:

$$E_{conv}=QV'=CV\,(V/2)=CV^2/2 \quad [1]$$

A similar argument applies to the discharge process, so a complete conventional charge-discharge cycle dissipates all the energy provided by the power supply, $QV=CV^2$.

In accordance with the present teachings, power dissipation is reduced by charging the capacitance of the load $C_L$ in several steps. This is illustrated in FIG. 2.

Figure 2:
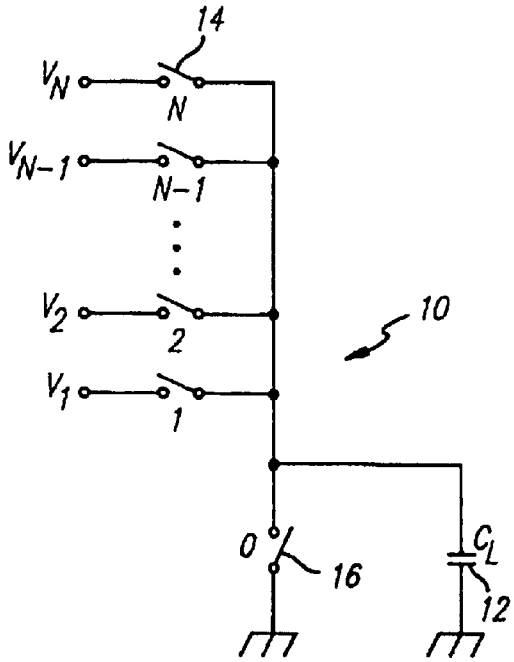
FIG. 2 PRIOR ART
FIG. 2 shows a system for charging the load capacitance by several steps and thereby reducing power dissipation.

FIG. 2 shows a system 10 for charging the load capacitance by several steps and thereby reducing power dissipation. Here, a bank of supply voltages $V_1$ to $V_N$ are used to charge the load 12. The voltages of the supplies are evenly distributed between ground and $V_N$ so that the voltage difference between any two adjacent supplies is the same. Each of the voltages is selectively applied to the load 12 by N switches including the first switch 14 and N−1 additional switches. Between charge cycles, switch 0 is closed. To charge the load, switch 0 is opened and the supplies $V_1$ through $V_N$ are connected to the load in succession by selectively closing the switches, that is, by momentarily closing switch 1, opening switch 1, momentarily closing switch 2 etc. To discharge the load, the supplies $V_{N-1}$ through $V_1$ are switched in in reverse order. Then switch 0 is closed connecting the output to ground.

If N steps are used, the dissipation per step is again given by the transferred charge and the average voltage drop across the switch resistance:

$$E_{step}=QV'=(CV/N)\,(V/2N)=CV2/2N^2 \quad [2]$$

To charge the capacitance all the way to the supply voltage V, N steps are used, so the total energy dissipation is:

$$\begin{aligned} E_{stepwise} &= N^*E_{step} \quad [3] \\ &= N^*CV^2/2N^2 \\ &= CV^2/2N \\ &= E_{conv}/N \end{aligned}$$

Again, a full charge-discharge cycle will cause twice the dissipation of the charging only. Thus, according to this simplified analysis, charging by several steps reduces the energy dissipation per charge-discharge cycle and thereby the total power dissipation, by a factor of N.

The multiple supply voltages of FIG. 2 may be generated with a battery stack. For equipment not powered by batteries or when the desired voltage increment is not a multiple of the battery cell voltage, a power supply unit would seemingly have to generate these multiple supply voltages with an associated cost in expense, complexity and power dissipation.

Figure 3:
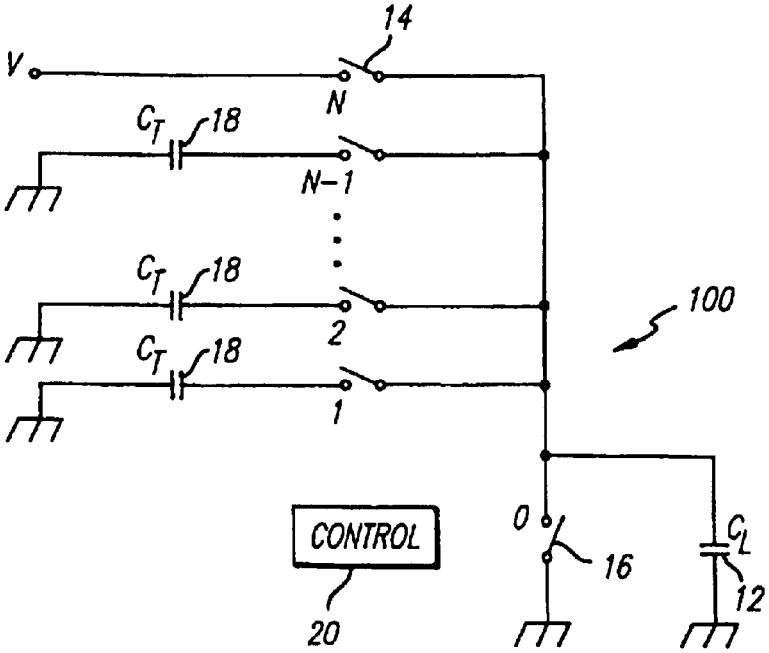
FIG. 3 is a simplified schematic of a preferred embodiment of the circuit of the present invention for reducing the power dissipation of a capacitive load.

FIG. 3 is a simplified schematic of a preferred embodiment of the circuit of the present invention for reducing the power dissipation of a capacitive load. The circuit 100 is essentially identical to that of FIG. 2 with the exception that the supplies $V_1$–$V_{N-1}$ are replaced with a corresponding number of capacitors $C_T$ 18 which will be referred to as "tank" capacitors. Each tank capacitor $C_T$ has a capacitance which is much, much larger (e.g. an order of magnitude) than the load capacitance $C_L$. Switch operations are sequenced by a control circuit 20.

Figure 4:
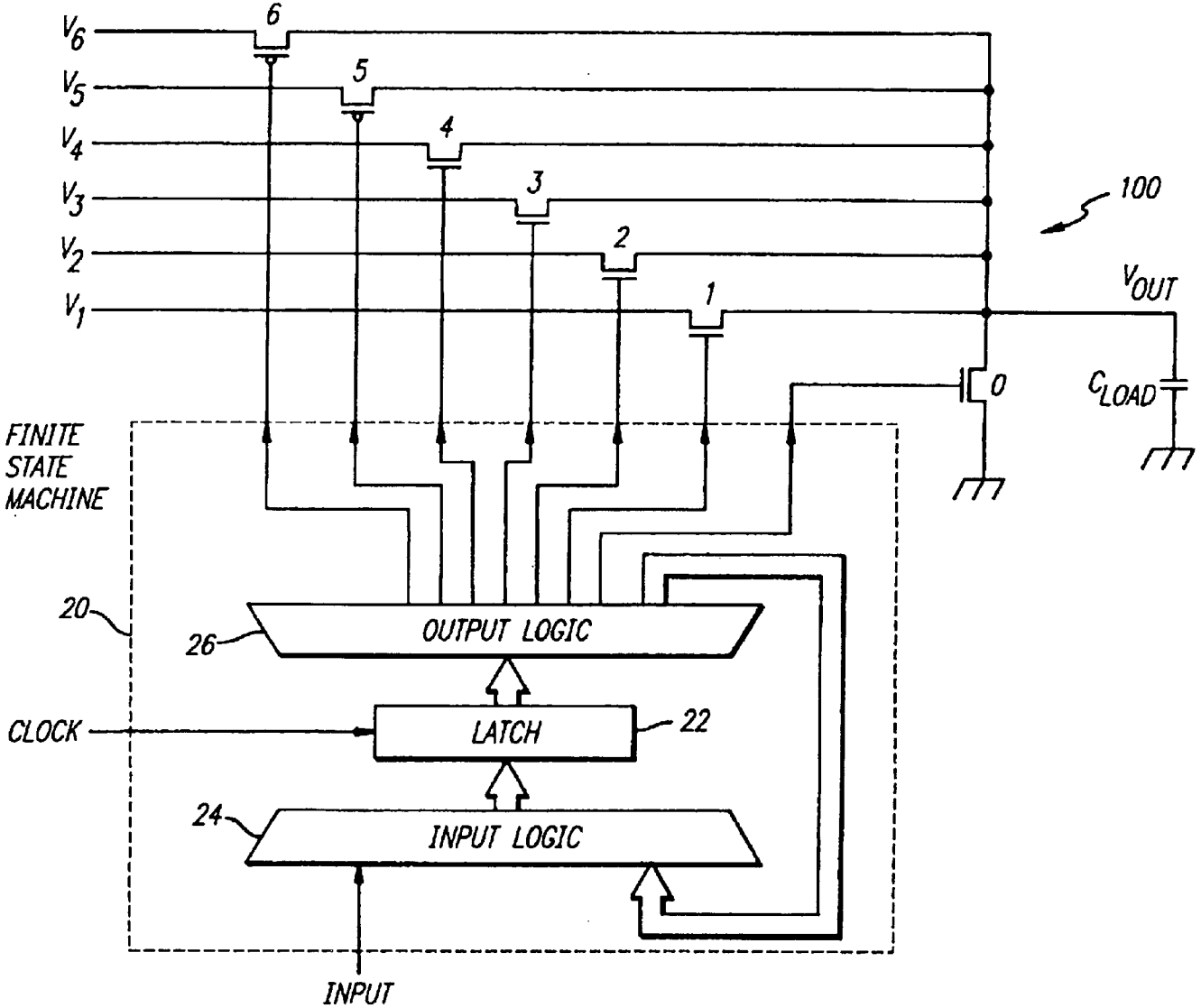
FIG. 4 is a diagram showing the control circuit of the driver constructed in accordance with the teachings of the present invention.

FIG. 4 is a diagram showing the control circuit 20 interconnected to plural MOSFET switches for an N=6 implementation of the driver constructed in accordance with the teachings of the present invention. In FIG. 4, the tank capacitors 18 are eliminated for simplicity. The control signals may be provided by the circuit 20 or may be supplied by a host microprocessor. The control circuit 20 may be implemented in several configurations. For example, the control circuit may be implemented with a microprocessor or with a shift register and a counter. In the alternative, a latch 22 and input and output logic circuits 24 and 26, respectively, may be used as shown in FIG. 4. The input and output logic circuits may be designed by a computer aided logic design program of which several are currently available. If a computer aided logic design program is used, the desired outputs would be specified in response to the expected input signals. The program would then design the logic circuits.

Timing signals are provided by a system clock (not shown) through the latch 22. In practice, the clock rate should be at least (N+1) times the output signal rate. In the preferred embodiment, switches 0–4 are implemented with n-channel MOSFET devices. Switches 5 and 6 are implemented with p-channel devices.

Figures 5F, 5G, 5H, 5I, 5J:
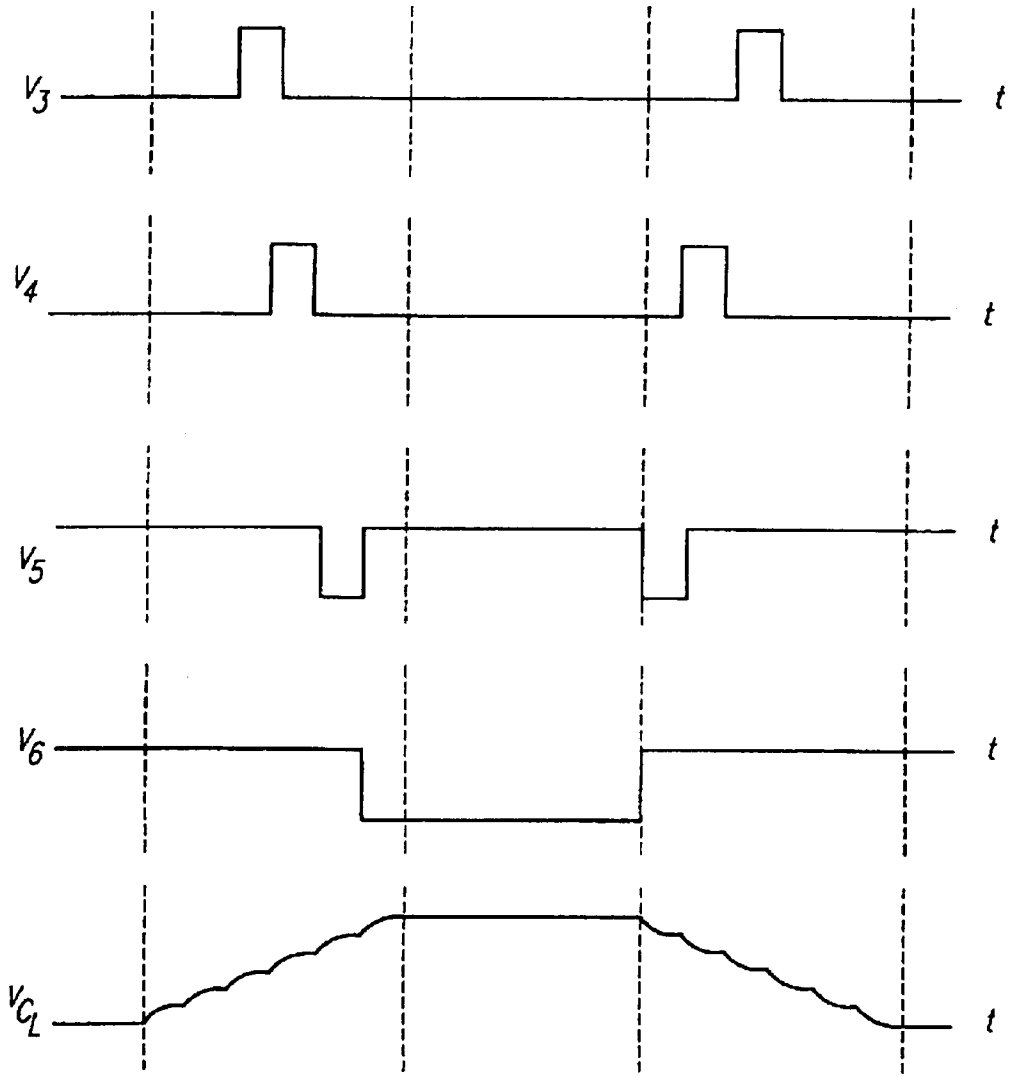
FIG. 5 is a timing diagram which illustrates the operation of the driver of the present invention.

FIG. 5 is a timing diagram which illustrates the operation of the driver 100 of the present invention. In FIG. 5(a), the clock pulses are shown. The input signal is shown in FIG. 5(b). FIGS. 5(c)–(i) show the controls for switch 0–6 and FIG. 5(j) shows the output at the load $C_L$.

The operation of the circuits of FIGS. 3 and 4 is essentially the same as that of FIG. 2. That is, in the initial standby condition switch 0 is closed and there is no charge on any of the capacitors in the system. Next, when an input pulse is to be transferred to the load, switch 0 is opened and switch 1 is closed. Since there is no charge on the load, $C_L$ nor on any of the tank capacitors $C_T$, there will be no charge transfer through any of the switches as each is closed, in turn, momentarily. When the first switch 14 is closed, a charge is applied to the load 12.

On the trailing edge of input pulse, a discharge cycle is initiated by when the switches are momentarily closed in reverse order. Thus, switch N is opened and switch N−1 is closed. Then switch N−1 is opened and switch N−2 is closed and etc. On the closure of switch N−1, the associated tank capacitor will receive most of the charge on the load capacitance. Each capacitor down the line will receive a lower charge than the immediately proceeding capacitor. After switch 1 opens, switch 0 closes to complete the cycle dumping the remaining charge on the load $C_L$ to ground. Thus, over several cycles the tank capacitors will approach their steady state voltages, for example, the (N−1) th through 1st tank capacitors may have charges of say 5, 4, 3, 2 and 1 volts respectively. Then, at the beginning of the next cycle, on the closure of the first switch, the voltage on the first tank capacitor is applied to the load, then the voltage on the second capacitor is applied to the load and so on. Thus, in the example, first 1 volt is applied to the load, then 2 volts, then three volts and etc. As a result, the voltage on the load will gradually increase as shown in FIG. 5(j).

The circuits of FIG. 3 and 4 will provide the same power dissipation reduction as that of FIG. 2, but without multiply supply lines and without complicating the power supply. This is illustrated by the following analysis. Assume that each tank capacitor $C_T$ is charged to the voltage of the corresponding supply of FIG. 2, and that the load capacitance $C_L$ is discharged. The load capacitance is charged by closing and opening switches 1 through N in succession. Each tank capacitor (and the power supply) delivers a charge given by:

$$q=C_L V/N \quad [4]$$

Since the tank capacitors are much larger than the load, the tank voltages do not change significantly, so the dissipation in the switches will be the same as for the case in FIG. 2, where the supply voltages are constant. To discharge the load capacitance, switches N−1 through 0 are closed and opened in succession. During the discharge, each tank capacitor receives a charge of the same size as that delivered during charge phase, and an equally sized charge is dumped to ground via switch 0. Over the full charge-discharge cycle, only the power supply injects any charge into the circuit. No net charge is drawn from any tank capacitor, so the tank voltages do not change.

The voltages of the tank capacitor bank are self-stabilizing. To appreciate this, assume that the voltage of one of the tank capacitors is slightly higher than it should be. Then, the charge delivered by this tank capacitor during the charging of the load will be somewhat larger than that given by equation [4], since the "step" from the voltage below is now slightly larger. During the discharge phase, the step from the voltage above is slightly smaller and the charge received is therefore smaller as well. Therefore, over the full cycle, a net decrease of the charge on the storage capacitor occurs, which causes a decrease in the capacitor voltage. The initial deviance is automatically counteracted.

Even if the tank capacitor voltages differ from the "correct" values, the circuit will work logically correctly, since each charging (discharging) cycle ends by connecting the load to he supply rail (ground). Voltage deviations simply bring higher dissipation. This happens during start-up, before the tank voltages have had time to converge to the even distribution between the supply voltage and ground.

The implementation cost of a driver such as that shown in FIG. 3 is determined by the tank capacitors, the switches, the mechanism controlling the switches, and the interconnections of same. Note that all extra interconnections are local. As for the conventional case, only one connection to the power supply is needed. Also, several drivers may share the same capacitor bank and part of the control mechanism.

The problem of maintaining the appropriate voltages on the tank capacitors is obviated by the fact that the capacitor voltages will converge automatically to the desired voltages. No additional circuitry is required. Only one supply line must be routed to the chip and the power supply need not be any more complicated than a conventional supply. In practice, the tank capacitors would be located off-chip.

For a CMOS implementation, the following design procedure may be followed to provide a driver configuration which exhibits minimal power dissipation.

Equation [3] indicates that dissipation decreases monotonically with increasing N. The number N cannot, however, be usefully made arbitrarily large because each step requires that a switch be turned on and off, which itself causes dissipation. Also, the energy used to drive each switch depends on the width of the device, which should be just enough to allow the charging to complete before the next step commences. Thus, for a given total allowable charging time 'T', there is an optimal number of steps and a set of optimal device sizes which lead to minimal total dissipation determined as follows.

Again, consider the circuit in FIG. 3 and assume the gates of the switch devices are driven conventionally. The load is charged and discharged once; the energy needed to drive the gates of the switch devices is:

$$E_{sw} = \left(\sum_{i=1}^{N} C_i + \sum_{i=0}^{N-1} C_i\right)V^2 \quad [5]$$

Allot each step one Nth of the total charging time T. Then:

$$T/N=mR_iC_L \quad [6]$$

Here, m is the number of RC time constants spent waiting for each charging step to complete. From equation [6], it is evident that all the switch devices should have equal on-resistance: $R_i=R_{sw}$. Decreasing the on-resistance of device i by increasing the width means increasing the gate capacitance:

$$R_iC_i=\rho_i \quad [7]$$

$\rho_i$ is a quality measure of the switch. It varies with i, since the bulk-to-channel and gate-to-channel voltages are different for different switches. Combining equations [5], [6], and [7] yields:

$$E_{sw} = \frac{Nm}{T}\left(\sum_{i=1}^{N} \rho_i + \sum_{i=0}^{N-1} \rho_i\right)C_L V^2 \quad [8]$$

Introducing $\bar{\rho}$, a weighted average of $\rho_i$ for the different switches:

$$\bar{\rho} = \frac{1}{2N}\left(\sum_{i=1}^{N} \rho_i + \sum_{i=0}^{N-1} \rho_i\right) \quad [9]$$

If N is sufficiently large, $\bar{\rho}$ is close to the unweighed average of ρ over the entire voltage range. Combining equations [3], [8] and [9] yields the following expression for the total energy dissipation:

$$E_{tot} = \left(\frac{1}{N} + 2N^2 m\frac{\bar{\rho}}{T}\right)C_L V^2 \quad [10]$$

The number N that minimizes $E_{tot}$ is given by:

$$N_{opt} = \sqrt[3]{\frac{T}{4m\bar{\rho}}} \quad [11]$$

The corresponding energy dissipation is:

$$E_{opt} = \frac{3}{2}\sqrt[3]{\frac{4m\bar{\rho}}{T}}\,C_L V^2 \qquad [12]$$

It remains to select the value for m. If it is chosen too small, there will still be a significant voltage across a switch when the next switch is to close. Hence, there is an increase in the average voltage across each switch and therefore a dissipation increase (the first term in equation [10] is changed slightly). If on the other hand, m is chosen unnecessarily large, time is wasted that could have been used to increase the number of steps. Thus, in general, optimization methods for the value of m vary according to the application, however, one skilled in the art will be able to select a suitable value for m using conventional teachings (e.g., a simulation program).

By using the number of stages given by equation [10], the designer can minimize the power dissipation of the driver. The minimum is rather shallow, however, so a lower N (as would most often be dictated by practical considerations) will still give a considerable improvement over the conventional case; N=2 already gives almost 50% reduction. Once N and m have been selected, the on-resistance of each switch is given by equation [6]. The corresponding gate capacitance, and thereby the width of the device, is given by equation [7]. The values of ρ for a certain process can be found by circuit simulation or by measuring the on-resistances of test devices of known widths.

Thus, the present invention has been described herein with reference to a particular embodiment for a particular application. Those having ordinary skill in the art and access to the present teachings will recognize additional modifications applications and embodiments within the scope thereof. For example, the switches may be closed in some other sequence as may be appropriate for a given application without departing from the scope of the present invention. In addition, alternative circuit topologies for the network of tank capacitors and switches may be appropriate. The second terminal of the load may be connected to a potentially variable) voltage other than ground.

It is therefore intended by the appended claims to cover any and all such applications, modifications and embodiments within the scope of the present invention.

Accordingly,

What is claimed is:

[1. A system for efficiently charging and discharging a capacitive load from a single voltage source of a first potential consisting of:

a first switch for selectively charging the load;

a second switch for selectively discharging the load;

plural capacitive elements; and switch means for selectively connecting each of the capacitive elements to the capacitive load to gradually charge or discharge the capacitive load.]

[2. The invention of claim 1 wherein said switch means includes plural third switches connected between said capacitive elements and said load.]

[3. The invention of claim 2 wherein said switch means includes means for selectively activating the first, second and third switches.]

[4. The invention of claim 3 wherein the capacitive load has a first terminal connected to the first switch and a second terminal connected to a source of a second potential.]

[5. The invention of claim 4 wherein the second switch has a first terminal connected to the first terminal of the load and a second terminal connected to said source of a second potential.]

[6. The invention of claim 5 wherein each of the third switches has a first terminal connected to the first terminal of the load and a second terminal connected to a first terminal of an associated one of the plural capacitive elements.]

[7. The invention of claim 6 wherein the means for selectively activating the first, second and third switches includes a finite state machine.]

[8. The invention of claim 7 wherein the finite state machine is designed to receive a clock signal and an input signal and provide selective activation signals for the first, second and third switches in response thereto.]

[9. The invention of claim 8 wherein a second terminal, of each of the plural capacitive elements is connected to said source of a second potential.]

[10. The invention of claim 9 wherein each of the capacitive elements has a capacitance which is at least an order of magnitude greater than the capacitance of the load.]

[11. A method for efficiently charging and discharging a capacitive load from a single voltage source including the steps of:

providing a first switch for selectively connecting the voltage source to the load;

providing a second switch for selectively providing a short across the load;

providing plural capacitive elements;

providing plural third switches for selectively connecting each of the capacitive elements to the capacitive load; and selectively activating the first, second and third switches to gradually charge or discharge the capacitive load.]

*12. A method for driving a capacitive load, comprising:*

*minimizing power dissipation by discharging the capacitive load by incremental voltage steps using a switching system which includes a switch for selectively discharging the load; and*

*electrically coupling a capacitive storage system to the capacitive load at an electrically floating node for discharging the capacitive load by one of the incremental voltage steps.*

*13. The method of claim 12, further comprising: charging and discharging the capacitive load between an upper voltage and a lower voltage by the incremental voltage steps.*

*14. The method of claim 13, wherein one of the incremental voltage steps is the difference of the upper and lower voltages divided by an integer N.*

*15. A system for driving a capacitive load, comprising:*

*means for minimizing power dissipation by discharging the capacitive load by incremental voltage steps using a switching system which includes a switch for selectively discharging the load; and means for electrically coupling a capacitive storage system to the capacitive load at an electrically floating node for discharging the capacitive load by one of the incremental voltage steps.*

*16. The system of claim 15, wherein the load capacitor is charged and discharged between an upper voltage and a lower voltage by the incremental voltage steps.*

*17. The system of claim 16, wherein one of the incremental voltage steps is the difference of the upper and lower voltages divided by an integer N.*

*18. A method for driving a load, the method comprising:*

*charging the load to a first level;*

*discharging the load to a second level using a switching system which includes a switch for selectively discharging the load, wherein during discharging to the second level, a first capacitor is charged to the second level by using the discharging charge of the load;*

*discharging the load to a third level using a switch; and*

*re-charging the load by using the charge of the first capacitor,*

*wherein the first level is higher from the second level and the second level is higher that the third level.*

*19. A method of claim 18, wherein during discharging the load to the third level, a second capacitor is charged to the third level by using the discharging charge of the load.*

*20. A system for charging and discharging a capacitive load in N steps, N being greater than 1, comprising:*

*N−1 capacitive devices; and*

*a first switching device operable to selectively couple and de-couple the N−1 capacitive devices to and from the capacitive load during a charging and a discharging of the capacitive load;*

*a switching system including a switch for selectively discharging the load,*

*whereby energy is recovered from the capacitive load and whereby the recovered energy is always stored substantially only in capacitance.*

*21. A system of claim 20, wherein the first switching device is operable to selectively couple and de-couple the N−1 capacitive devices to and from the capacitive load during both the charging and the discharging of the capacitive load.*

*22. The system of claim 21, wherein each of the N−1 capacitive devices includes a capacitor.*

*23. The system of claim 22, wherein a capacitance of the capacitor is greater than a capacitance of the capacitive load.*

*24. The system of claim 20, wherein the first switching device includes a MOSFET.*

*25. The system of claim 20, wherein the selective coupling and de-coupling of the N−1 capacitive devices to the capacitive load causes at least one of the charging and the discharging of the capacitive load to occur in the N steps.*

*26. The system of claim 20, further comprising:*

*a second switching device operable to selectively couple the capacitive load to a voltage source, and*

*a third switching device operable to selectively provide a short across the capacitive load.*

*27. A method for charging and discharging a capacitive load comprising:*

*selectively coupling and de-coupling a capacitive device to and from the capacitive load to cause the charging and the discharging of the capacitive load to occur in a plurality of steps using a switching system which includes a switch for selectively discharging the load,*

*whereby energy is recovered from the capacitive load and whereby the recovered energy is always stored substantially only in capacitance.*

* * * * *